United States Patent
Cheng et al.

(10) Patent No.: US 9,607,777 B2
(45) Date of Patent: Mar. 28, 2017

(54) SEPARATOR AND ELECTROCHEMICAL DEVICE

(71) Applicant: Ningde Amperex Technology Limited, Ningde (CN)

(72) Inventors: Sheng Cheng, Ningde (CN); Shaojun Niu, Ningde (CN); Dongming He, Ningde (CN); Xiaowen Zhang, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 456 days.

(21) Appl. No.: 14/147,463

(22) Filed: Jan. 3, 2014

(65) Prior Publication Data

US 2015/0004498 A1    Jan. 1, 2015

(30) Foreign Application Priority Data

Jun. 26, 2013 (CN) .......................... 2013 1 0259757

(51) Int. Cl.
*H01M 2/18* (2006.01)
*H01G 11/52* (2013.01)
(Continued)

(52) U.S. Cl.
CPC ............ *H01G 11/52* (2013.01); *H01M 2/145* (2013.01); *H01M 2/18* (2013.01); *H01G 11/06* (2013.01); *H01M 10/052* (2013.01); *Y02E 60/13* (2013.01)

(58) Field of Classification Search
CPC ........ H01G 11/04; H01G 11/52; H01G 11/06; H01M 2/14; H01M 2/145; H01M 2/18; H01M 10/052; Y02E 60/13; Y02P 70/54
See application file for complete search history.

(56) References Cited

U.S. PATENT DOCUMENTS 6,468,698 B1 * 10/2002 Hamano ................. H01M 2/16
29/623.4
2003/0013007 A1 * 1/2003 Kaun ................... H01M 2/0227
429/94
(Continued)

FOREIGN PATENT DOCUMENTS

CN           201853756 U   *  6/2011
CN           202585643     * 12/2012

OTHER PUBLICATIONS

CN 201853756U MT.*

(Continued)

*Primary Examiner* — Patrick Ryan
*Assistant Examiner* — Alex Usyatinsky
(74) *Attorney, Agent, or Firm* — Morgan, Lewis & Bockius LLP

(57) ABSTRACT

The present disclosure provides a separator and an electrochemical device, the separator is provided with a folded structure unit across a widthwise direction of the separator, and an overlapping part of the folded structure unit is filled with an adhesive. When the separator is applied into a production of the electrochemical device, a winding process can be performed as usual. After an electrolyte injection or high temperature aging of the electrochemical device, the adhesive filled in the folded structure unit of the separator may be dissolved into the electrolyte, the folded structure unit can be unfolded to a flat position again, so as to effectively eliminate deformation of the electrochemical device, which may be caused by thermal contraction of the separator, over stress in the separator wound in a cell, or the separator's binding on expansion of negative and positive electrodes, during operation and production of the electrochemical device.

18 Claims, 2 Drawing Sheets

(51) Int. Cl.
*H01M 2/14* (2006.01)
*H01M 10/052* (2010.01)
*H01G 11/06* (2013.01)

(56) References Cited

U.S. PATENT DOCUMENTS

| | | | |
|---|---|---|---|
| 2005/0233212 A1* | 10/2005 | Kaun | H01M 2/0225 429/176 |
| 2010/0081046 A1* | 4/2010 | Davis | H01M 2/18 429/133 |
| 2011/0287286 A1 | 11/2011 | Ahn et al. | |
| 2012/0135285 A1* | 5/2012 | Iwama | H01M 2/26 429/94 |

OTHER PUBLICATIONS

CN 202585643 MT.*
Notification to grant paten from SIPO for Appl #No. 201310259757.8.*

* cited by examiner

SEPARATOR AND ELECTROCHEMICAL DEVICE

REFERENCE TO RELATED APPLICATIONS

The present disclosure claims priority to Chinese Patent Application No. CN 201310259757.8 filed on Jun. 26, 2013, the content of which is fully incorporated in its entirety herein.

FIELD OF THE PRESENT DISCLOSURE

The present disclosure relates to field of electrochemistry, and more particularly to a separator and an electrochemical device.

BACKGROUND OF THE PRESENT DISCLOSURE

At present, a lithium-ion secondary battery mainly adopts a winding structure or a laminating structure, one of their common characteristics is that a large amount of separator is required to be used to separate a cathode and an anode. During charging-discharging cycles of an winding-type lithium-ion battery or a zigzag-shaped laminated lithium-ion battery, the following stresses will be generated: (1) the anode after lithium intercalation has a substantial increase in thickness, the structure of cathode becomes loose after many times of lithium intercalation-deintercalation, the thicknesses of electrode plates increase after many times of forming and decomposing of a passivation film (Solid Electrolyte Interface (SEI) Film) on the cathode or anode, therefore the cell is stressed by the separator covering outside, wherein the stress points toward inside of the cell; (2) the separator shrinks after being heated, a length of the separator shortens, so that the negative and positive electrode plates are stressed by the separator because of its shrinkage; (3) in a cell with winding structure, in order to maintain staggered location of the separator and the cathode and anode, a high stress would be applied to straighten the electrode plates and the separator for winding, but this stress can not be released. The above three stresses will result in irreversible deformation of the cell of the lithium-ion battery during its operation or production, wherein the irreversible deformation is presented as bump, wrinkling, or significant local thickness increase, and the like, which appear in the body of the cell. When the deformation is serious, electronic mobile terminal equipment cannot accommodate the battery with the increased thickness, the equipment may be opened due to such deformation, thereby affecting customer's operation. At present, methods of reducing winding stress, coating a large amount of buffer layers on electrode plates or separator, and the like, are mostly adopted to avoid these problems, but these methods involve various devices and materials, and have very complicated processes, high cost and low qualified rate. In addition, separator is required to be drawn to a predetermined width, thickness and length in a manufacturing process of the separator, therefore the separator accumulates a certain contraction stress toward the center, wherein the stress is presented as that the length gets shorter with time elapsing and the width gets narrower with time elapsing. Although there are various processes to relieve the contraction stress during operation of the separator, the contraction stress cannot be completely eliminated. After the separator is wound to form the cell, the contraction stress which has not eliminated gradually releases with time elapsing, thereby making the cell be subjected to a stress pointing toward the center and gradually increasing.

SUMMARY OF THE PRESENT DISCLOSURE

In view of the problem in the background of the present disclosure, an object of the present disclosure is to provide a separator and an electrochemical device, when the separator is applied into the electrochemical device, the separator can effectively eliminate deformation of the electrochemical device, which may be caused by thermal contraction of the separator, over stress in the separator wound in a cell, or the separator's binding on expansion of negative and positive electrode plates, during production and electrochemical cycles of the electrochemical device.

In order to achieve the above object, in a first aspect, the present disclosure provides a separator, the separator is provided with a folded structure unit across a widthwise direction of the separator, and an overlapping part of the folded structure unit is filled with an adhesive.

In order to achieve the above object, in a second aspect, the present disclosure provides an electrochemical device, which comprises the separator according to the first aspect of the present disclosure.

The electrochemical device is selected from one of a lithium-ion secondary battery, a lithium battery, and a lithium-ion super-capacitor.

The present disclosure has the following beneficial effects.

When the separator having the folded structure unit is applied into a production of the electrochemical device, a winding process can be performed as usual. After an electrolyte injection or high temperature aging of the electrochemical device, the adhesive filled in the folded structure unit of the separator may be dissolved into the electrolyte, the folded structure unit can be unfolded to a flat position again, so as to effectively eliminate deformation of the electrochemical device, which may be caused by thermal contraction of the separator, over stress in separator wound in a cell, or the separator's binding on expansion of the negative and positive electrode plates, during operation and production of the electrochemical device.

Figure 1:
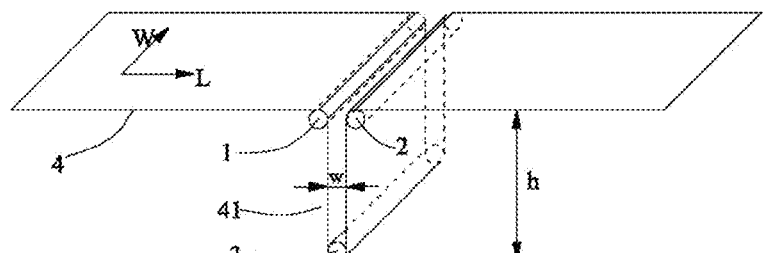
FIG. 1 is a schematic view illustrating a transmission mode for forming a folded structure unit of a separator according to the present disclosure.

Reference numerals of the embodiments are represented as follows:

1, 2, 3 fixing rotation shaft
4 separator
41 folded structure unit
5 adhesive
w overlapping width
h overlapping height
L lengthwise direction
W widthwise direction

DETAILED DESCRIPTION OF THE ILLUSTRATED EMBODIMENTS

Hereinafter a separator, an electrochemical device, a lithium-ion battery using the separator and testing results of the lithium-ion battery according to the present disclosure will be described in combination with the drawings.

Firstly, a separator according to a first aspect of the present disclosure will be described.

Figure 3:
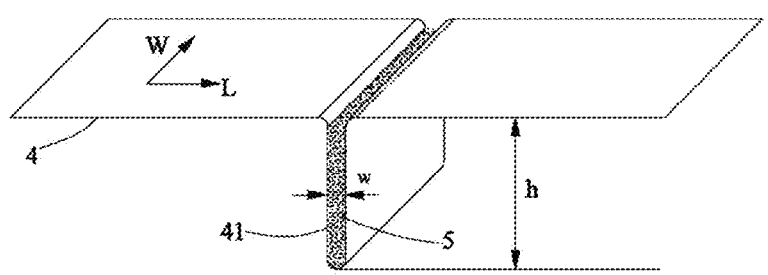
FIG. 3 is a structure schematic view of the folded structure unit of the separator with an adhesive according to the present disclosure.
Figure 4:
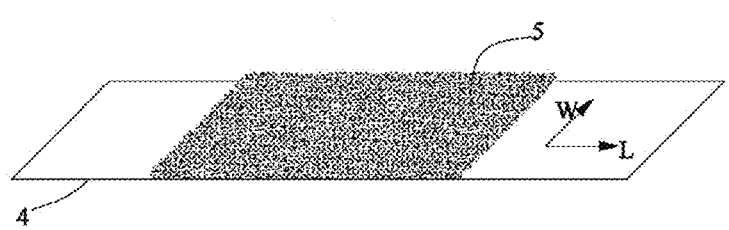
FIG. 4 was a schematic view of the separator provided with the folded structure unit after electrolyte injection and high-temperature aging process of a lithium-ion battery according to the present disclosure.

As shown in FIG. 3, a separator 4 according to the first aspect of the present disclosure is provided with a folded structure unit 41 across a widthwise direction W of the separator 4, an overlapping part of the folded structure unit 41 is filled with an adhesive 5.

Figure 2:
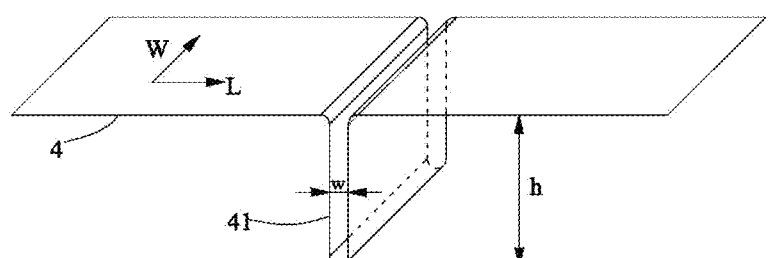
FIG. 2 is a structure schematic view of the folded structure unit without an adhesive according to the present disclosure.

In the separator 4 according to the first aspect of the present disclosure, as shown in FIG. 1 to FIG. 3, preferably, the folded structure unit 41 across the widthwise direction W of the separator 4 is perpendicular to a plane where a lengthwise direction L of the separator 4 and the widthwise direction W of the separator 4 are positioned.

In the separator 4 according to the first aspect of the present disclosure, preferably, an overlapping width w of the folded structure unit 41 is 0.002 mm~10.0 mm. The overlapping width w determines a thickness of the adhesive 5. Preferably, the overlapping width w of the folded structure unit 41 is 10 µm~400 µm; More preferably, the overlapping width w of the folded structure unit 41 is 15 µm~200 µm.

In the separator 4 according to the first aspect of the present disclosure, preferably, an overlapping height h of the folded structure unit 41 is 0.002 mm~20.0 mm. The overlapping height h may be determined according to a size of an electrochemical device (for example, a lithium-ion secondary battery) in which the separator 4 is used or potential deformation degree. For 3C type lithium-ion batteries, the overlapping height h of the folded structure unit 41 may be 10 µm~100 µm, preferably 15 µm~50 µm; for EV type lithium-ion batteries, the overlapping height h of the folded structure unit 41 may be 0.05 mm~10.0 mm, preferably 1.0 mm~5.0 mm.

After the separator 4 having the folded structure unit 41 is applied into a lithium-ion battery, the folded structure unit 41 is pressed therein. When the overlapping height h is larger (generally larger than 1.0 mm), the folded structure unit 41 may be pressed against the plane where the lengthwise direction L of the separator 4 and the widthwise direction W of the separator 4 are positioned due to a support of a large amount of the adhesive 5.

In the separator 4 according to the first aspect of the present disclosure, preferably, the adhesive 5 is selected from at least one of polyvinylidene fluoride (PVDF), ethylene carbonate (EC), polyacrylic acid (PAA), polyacrylonitrile (PAN), sodium carboxymethyl cellulose (NaCMC), lithium carboxymethyl cellulose (LiCMC), poly(ethylene oxide) (PEO), poly(vinyl alcohol) (PVA) and polytetrafluoroethylene (PTFE). Preferably, a coating density of the adhesive 5 is $0.5 \times 10^{-3}$~$5.0 \times 10^{-3}$ mg/mm². Preferably, after the adhesive 5 filled in the overlapping part of the folded structure unit 41 is cured, a bearable tensile force of the folded structure unit 41 along the lengthwise direction L of the separator 4 is 1.0~10.0 N/mm².

In the separator 4 according to the first aspect of the present disclosure, the separator 4 may be one of pure polyethylene (PE), pure polypropylene (PP), poly(ethylene oxide) (PEO) or multi-layer composite structure.

Secondarily, an electrochemical device according to a second aspect of the present disclosure will be described.

The electrochemical device according to the second aspect of the present disclosure comprises the separator 4 according to the first aspect of the present disclosure.

In the electrochemical device according to the second aspect of the present disclosure, the separator 4 of the electrochemical device is provided with at least one of the folded structure unit 41.

In the electrochemical device according to the second aspect of the present disclosure, the electrochemical device may be selected from one of lithium-ion secondary battery, lithium battery, and lithium-ion super-capacitor.

Next, a preparation process of the separator 4 according to the present disclosure will be described.

As shown in FIG. 1 to FIG. 4, a transmission mode that the separator 4 passes through fixing rotation shafts is employed, where the fixing rotation shaft 1, the fixing rotation shaft 2, and the fixing rotation shaft 3 are parallel, a interval between the fixing rotation shaft 1 and the fixing rotation shaft 2 is equal to the sum of double separator 4's thickness and the overlapping width w of the folded structure unit 41 of the separator 4. A distance from the fixing rotation shaft 3 to a plane formed by the fixing rotation shaft 1 and the fixing rotation shaft 2 is equal to the overlapping height h of the folded structure unit 41 of the separator 4. In FIG. 1, diameters of the fixing rotation shaft 1, the fixing rotation shaft 2, and the fixing rotation shaft 3 are optimally in a range of 0.1-10.0 mm. The separator 4 can be formed with the folded structure unit 41 as shown in FIG. 2 after fixation formation by the fixing rotation shaft 1, the fixing rotation shaft 2, and the fixing rotation shaft 3. In order to form a plurality of folded structure units 41 in one separator 4, the same separator 4 may repeatedly pass through the fixing rotation shaft 1, the fixing rotation shaft 2, and the fixing rotation shaft 3, or may pass through a plurality of sets of fixing rotation shaft 1, the fixing rotation shaft 2, and the fixing rotation shaft 3.

After the folded structure unit 41 as shown in FIG. 2 is formed, the adhesive 5 is filled in the overlapping part of the folded structure unit 41, as shown in FIG. 3. The adhesive 5 can be filled by spray method or injection method and the like, an area filled with the adhesive 5 of the overlapping part of the folded structure unit 41 is preferably equal to an area of the overlapping part of the folded structure unit 41, and also may be larger or smaller than that area. Curing treatment on the adhesive 5 is performed for the separator 4 provided with the folded structure unit 41 filled with the adhesive 5, the curing condition of the adhesive 5 may be determined according to the type of the selected adhesive 5 (for example, performing baking or standby at high temperature condition or room temperature condition). An adhesion force of the folded structure unit 41, after the adhesive 5 is cured, shall be larger than a stretching force or a tensile force borne by the separator 4 when the separator 4 is wound.

Subsequently a process for applying the prepared separator 4 into the lithium-ion battery is described.

The separator 4 with cured adhesive 5 was applied to a winding process of a lithium-ion cell to prepare a battery. The battery was disassembled after electrolyte injection and high temperature aging process, it can be observed that the adhesive 5 in the folded structure unit 41 of the separator 4 had dissolved into the electrolyte, and a folded length of the folded structure unit 41 was effectively released (referring to FIG. 4, the separator 4 is shown to still have the adhesive 5 on its surface in FIG. 4 for purposes of clarity), therefore deformation of the battery caused by tensile forces due to expansion of negative positive electrode plates and contraction of the separator 4 can be effectively eliminated.

Finally testing results of the lithium-ion battery using the prepared separator 4 were presented.

Figure 5:
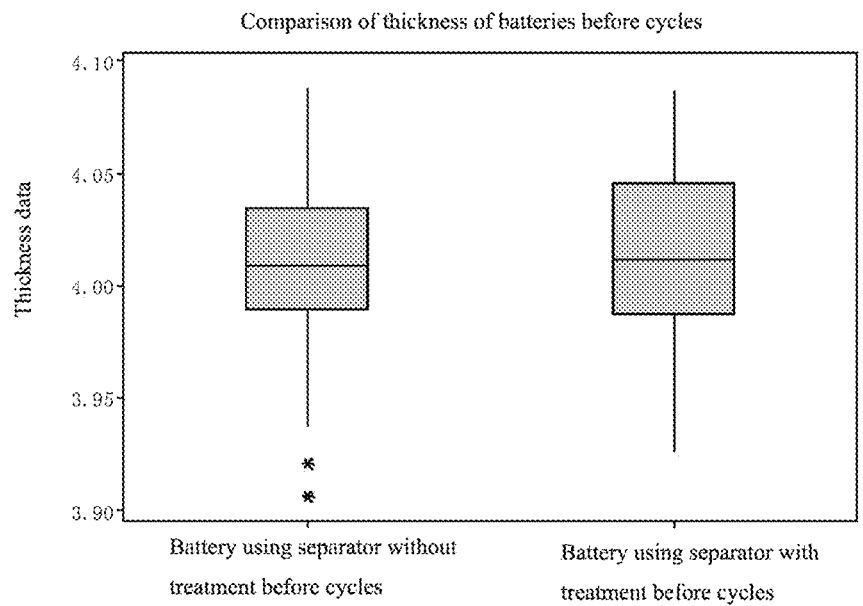
FIG. 5 was a thickness data graph of batteries using a separator with treatment and using a separator without treatment before cycles.
Figure 6:
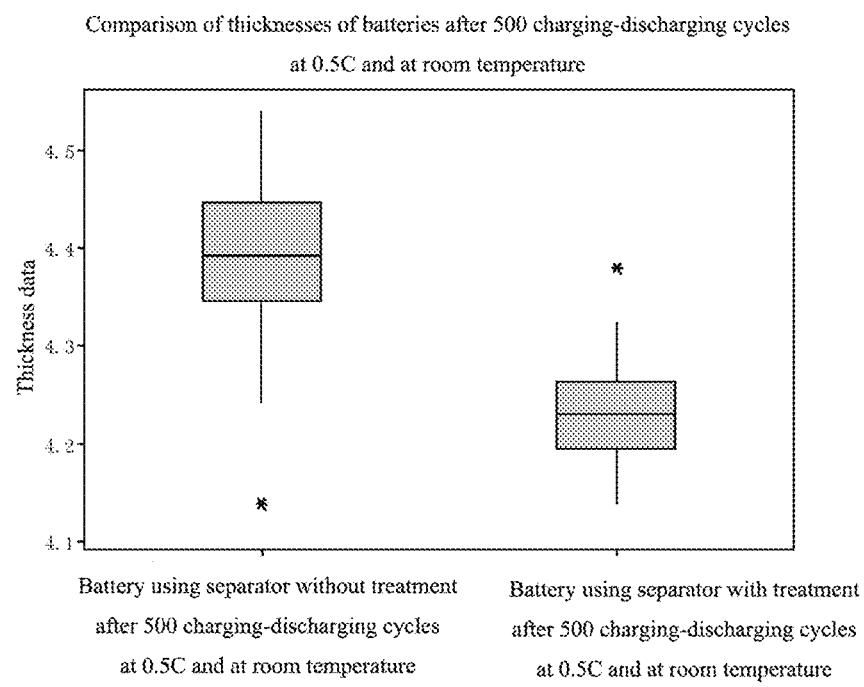
FIG. 6 was a thickness data graph of batteries using the separator with treatment and using the separator without treatment after 500 charging-discharging cycles at 0.5 C and at room temperature.

As shown in FIG. 5 and FIG. 6, a separator without treatment refers to a separator which is not provided with the folded structure unit 41 (Hereinafter referred to as a comparative example), a separator with treatment refers to a separator which is provided with the folded structure unit 41 and the folded structure unit 41 is filled with the adhesive 5 (Hereinafter referred to as an example).

In the comparative example and the example in FIG. 5 and FIG. 6, a material of the separator was pure polyethylene (PE) having a thickness of 0.012 mm. A width of the separator was 76.5 mm, the folded structure unit 41 was perpendicular to a plane where a lengthwise direction L of the separator 4 and a widthwise direction W of the separator 4 were positioned, and an overlapping height h of the folded structure unit 41 was 0.40 mm, an overlapping width w of the folded structure unit 41 was 0.2 mm.

Provision of the adhesive 5 in the folded structure unit 41: polyvinylidene fluoride (PVDF) acetone solution with solid content of 20% was sprayed on the overlapping part of the folded structure unit 41, a spraying density was $1.30\times10^{-3}$ mg/mm$^2$, the parameters for the adhesive curing process were 4 hours and 35° C., the bearable tensile force of the folded structure unit 41 was 3.6 N/mm$^2$.

Preparation of a positive electrode plate: the positive electrode material was pure lithium cobaltate; lithium cobaltate, conductive carbon and an adhesive of polyvinylidene fluoride (PVDF), at a weight ratio of 95%:2%:3%, were dissolved into N-methylpyrrolidinone (NMP), to form a slurry, a current collector adopted was an aluminum foil having a thickness of 0.014 mm, a coating amount of the slurry was $0.18\times10^{-3}$ mg/mm$^2$, and then rolling and baking at 85° C. were performed.

Preparation of a negative electrode plate: the negative electrode material was artificial graphite, graphite, conductive carbon and an adhesive of styrene butadiene rubber (SBR), at a weight ratio of 94%:2%:4%, were dissolved into deionized water, to form a slurry, the current collector adopted was a copper foil having a thickness of 0.009 mm, the slurry was coated on the copper foil with a coating amount of $9.4\times10^{-5}$ mg/mm$^2$, and then rolling and baking at 110° C. were performed.

The positive electrode plate, the separator 4, and the negative electrode plate were wound together, and then packaged with a packaging aluminum film to form a lithium-ion battery, where the dimension of the battery had a length upper limit of 81.10 mm, a width upper limit of 33.88 mm, a thickness upper limit of 4.07 mm. The total thickness of the packaging aluminum film was 0.088 mm.

Then, an electrolyte was injected, a non-aqueous organic solvent of the electrolyte was composed of ethylene carbonate, propylene carbonate and diethyl carbonate at a weight ratio of 30%:30%:40%, lithium salt was LiPF$_6$ and a concentration of the lithium salt in the electrolyte was 1 mol/L; an aging process of the battery was charging the battery to 3.85V, storing at 45° C. for 48 hours, and storing at 25° C. for 48 hours.

The preparation for the comparative example was the same as the above, only not involving the step of the provision of the folded structure unit 41 in the separator 4 of the example. By adopting identical battery design and identical battery manufacturing process, ten lithium-ion batteries were prepared with the separator without treatment, and ten lithium-ion batteries were prepared with the separator with treatment. The thickness distribution at a same state after the above preparation process was shown in FIG. 5 and FIG. 6. As the separator with treatment will result in a certain thickness increment, an average thickness (4.015 mm) of the battery using the separator with treatment was slightly larger than an average thickness (4.010 mm) of the battery using the separator without treatment.

But after a cycling test (500 cycles at room temperature, and charging-discharging at 0.5 C) of the battery at the same condition, an average thickness (4.390 mm) and a thickness standard deviation (0.080) of the battery using the separator without treatment were both obviously larger than an average thickness (4.230 mm) and a thickness standard deviation (0.048) of the battery using the separator with treatment, it was shown that the separator with treatment can effectively eliminate the battery deformation caused by expansion of the negative and positive electrodes and contraction of the separator after charging-discharging cycles.

What is claimed is:

1. A separator comprising a folded structure unit across a widthwise direction (W) of the separator, an overlapping part of the folded structure unit being filled with an adhesive, wherein the folded structure unit is positioned between two opposite ends of the separator and the two opposite ends of the separator are in a lengthwise direction of the separator, wherein after the adhesive filled in the overlapping part of the folded structure unit is cured, a bearable tensile force of the folded structure unit along a lengthwise direction (L) of the separator is 1.0~10.0 N/mm$^2$.

2. The separator according to claim 1, wherein the folded structure unit is perpendicular to a plane where a lengthwise direction (L) of the separator and the widthwise direction (W) of the separator are positioned.

3. The separator according to claim 1, wherein an overlapping width (w) of the folded structure unit is 0.002 mm~10.0 mm.

4. The separator according to claim 3, wherein the overlapping width (w) of the folded structure unit is 10 μm~400 μm.

5. The separator according to claim 4, wherein the overlapping width (w) of the folded structure unit is 15 μm~200 μm.

6. The separator according to claim 1, wherein an overlapping height (h) of the folded structure unit is 0.002 mm~20.0 mm.

7. The separator according to claim 6, wherein the overlapping height (h) of the folded structure unit is 10 μm~100 μm.

8. The separator according to claim 7, wherein the overlapping height (h) of the folded structure unit is 15 μm~50 μm.

9. The separator according to claim 6, wherein the overlapping height (h) of the folded structure unit is 0.05 mm~10.0 mm.

10. The separator according to claim 9, wherein the overlapping height (h) of the folded structure unit is 1 mm~5 mm.

11. The separator according to claim 1, wherein a coating density of the adhesive is $0.5\times10^{-3}$~$5.0\times10^{-3}$ mg/mm$^2$.

12. The separator according to claim 1, wherein the adhesive is selected from at least one of polyvinylidene fluoride, ethylene carbonate, polyacrylic acid, polyacrylonitrile, sodium carboxymethyl cellulose, lithium carboxymethyl cellulose, poly(ethylene oxide), poly(vinyl alcohol) and polytetrafluoroethylene.

13. The separator according to claim 1, wherein the separator is one of polyethylene, pure polypropylene, poly (ethylene oxide) or multi-layer composite structure.

14. An electrochemical device, comprising:
a separator, the separator comprising a folded structure unit across a widthwise direction (W) of the separator, an overlapping part of the folded structure unit being filled with an adhesive, wherein the folded structure unit is positioned between two opposite ends of the separator and the two opposite ends of the separator are in a lengthwise direction of the separator, wherein after the adhesive filled in the overlapping part of the folded structure unit is cured, a bearable tensile force of the folded structure unit along a lengthwise direction (L) of the separator is 1.0~10.0 N/mm$^2$.

15. The electrochemical device according to claim 14, wherein the separator of the electrochemical device is provided with at least one of the folded structure unit.

16. The electrochemical device according to claim 14, wherein the electrochemical device is selected from one of a lithium-ion secondary battery, a lithium battery and a lithium-ion super-capacitor.

17. The electrochemical device according to claim 14, wherein the overlapping height (h) of the folded structure unit is 10 μm~100 μm.

18. The electrochemical device according to claim 14, wherein the overlapping height (h) of the folded structure unit is 0.05 mm~10.0 mm.

* * * * *